US005115469A

United States Patent [19]

Taniguchi et al.

[11] Patent Number: 5,115,469

[45] Date of Patent: May 19, 1992

[54] SPEECH ENCODING/DECODING APPARATUS HAVING SELECTED ENCODERS

[75] Inventors: Tomohiko Taniguchi, Yokohama; Kohei Iseda; Koji Okazaki, both of Kawasaki; Fumio Amano, Tokyo; Shigeyuki Unagami, Atsugi; Yoshinori Tanaka, Yokohama; Yasuji Ohta, Kawasaki, all of Japan

[73] Assignee: Fujitsu Limited, Kawasaki, Japan

[21] Appl. No.: 460,099

[22] PCT Filed: Jun. 7, 1989

[86] PCT No.: PCT/JP89/00580

§ 371 Date: Feb. 8, 1990

§ 102(e) Date: Feb. 8, 1990

[87] PCT Pub. No.: WO89/12292

PCT Pub. Date: Dec. 14, 1989

[30] Foreign Application Priority Data

Jun. 8, 1988 [JP] Japan .............................. 63-141343

Mar. 14, 1989 [JP] Japan .............................. 1-61533

[51] Int. Cl.[5] .............................. G01L 5/00

[52] U.S. Cl. .............................. 381/36; 381/34

[58] Field of Search .............................. 381/29-40; 364/513.5; 375/22-24, 34, 122

[56] References Cited

U.S. PATENT DOCUMENTS 3,067,291 12/1962 Lewinter .............................. 381/31

3,903,366 9/1975 Coulter .............................. 381/38

4,005,274 1/1977 Vagliani et al. .............................. 381/32

4,303,803 12/1981 Yatsuzuka .............................. 581/31

4,546,342 10/1985 Weaver et al. .............................. 375/122

4,622,680 11/1986 Zinser .............................. 381/31

*Primary Examiner*—Emanuel S. Kemeny

*Assistant Examiner*—Michelle Doerrler

*Attorney, Agent, or Firm*—Staas & Halsey

[57] ABSTRACT

Several encoders perform a local decoding of a speech signal and extract excitation information and vocal tract information from a speech signal for an encoding operation. The transmission rate ratio between the excitation information and the vocal tract information are different for each encoder. An evaluation/selection unit evaluates the quality of decoded signals subjected to a local decoding in each of the encoders, determines the most suitable encoders from among the several encoders based on the result of the evaluation, and selects the most suitable encoder, thereby outputting the selection result as selection information. The decoder decodes a speech signal based on selection information, vocal tract information and excitation information. The evaluation/selection unit selects the output from the encoder in which the quality of a locally decoded signal is the most preferable. When vocal tract information changes little, the vocal tract information is not output, thereby allowing for increased quality of information. As much of the surplus of unused vocal tract information as possible is assigned to a residual signal. Thus, the quality of a decoded speech signal is improved.

12 Claims, 7 Drawing Sheets

| | |
|---|---|
| CODE NUMBER | 1600 bps |
| GAIN | 1000 " |
| PITCH FREQUENCY | 600 " |
| PITCH COEFFICIENT | 600 " |
| LPC PARAMETERS | 1000 " |
| TOTAL | 4800 bps |

FIG. 7A
PRIOR ART

| | A-MODE | B-MODE |
|---|---|---|
| CODE NUMBER | 1600 bps | 2200 bps |
| GAIN | 1000 " | 1350 " |
| PITCH FREQUENCY | 600 " | 600 " |
| PITCH COEFFICIENT | 600 " | 600 " |
| LPC PARAMETERS | 950 " | — |
| MODE SIGNAL | 50 " | 50 " |
| TOTAL | 4800 bps | 4800 bps |

FIG. 7B

SPEECH ENCODING/DECODING APPARATUS HAVING SELECTED ENCODERS

BACKGROUND OF THE INVENTION

1. Field of the Invention

The present invention relates to a speech encoding and decoding apparatus for transmitting a speech signal after information compression processing has been applied.

Recently, a speech encoding and decoding apparatus for compressing speech information to data of about 4 to 16 kbps at a high efficiency has been demanded for in-house communication systems, digital mobile radio systems and speech storing systems.

2. Description of Related Art

As the first prior art structure of a speech prediction encoding apparatus, there is provided an adaptive prediction encoding apparatus for multiplexing the prediction parameters (vocal tract information) of a predictor and residual signal (excitation information) for transmission to the receiving station.

FIG. 1 is a block diagram of an encoder used in the speech encoding apparatus of the first prior art structure. Encoder 100, comprises linear prediction analysis unit 101, predictor 102, quantizer 103, multiplexing unit 104 and adders 105 and 106.

Linear prediction analysis unit 101 analyzes input speech signals and outputs prediction parameters, and predictor 102 predicts input signals using an output from adder 106 (described below) and prediction parameters from linear prediction analysis unit 101. Adder 105 outputs error data by computing the difference between an input speech signal and the predicted signal, quantizer 103 obtains a residual signal by quantizing the error data, and adder 106 adds the output from predictor 102 to that of quantizer 103, thereby enabling the output to be fed back to predictor 102. Multiplexing unit 104 multiplexes prediction parameters from linear prediction analysis unit 101 and a residual signal from quantizer 103 for transmission to a receiving station.

With such a structure, linear prediction analysis unit 101 performs a linear prediction analysis of an input signal at every predetermined frame period, thereby extracting prediction parameters as vocal tract information to which appropriate bits are assigned by an encoder (not shown). The prediction parameters are thus encoded and output to predictor 102 and multiplexing unit 104. Predictor 102 predicts an input signal based on the prediction parameters and an output from adder 106. Adder 105 computes the error data (the difference between the predicted information and the input signal), and quantizer 103 quantizes the error data, thereby assigning appropriate bits to the error data to provide a residual signal. This residual signal is output to multiplexing unit 104 as excitation information.

After that, the encoded prediction parameter and residual signal are multiplexed by multiplexing unit 104 and transmitted to a receiving station.

Adder 106 adds an input signal predicted by predictor 102 and a residual signal quantized by quantizer 103. An addition output is again input to predictor 102 and is used to predict the input signal together with the prediction parameters.

In this case, the number of bits assigned to prediction parameters for each frame is fixed at $\alpha$-bits per frame and the number of bits assigned to the residual signal is fixed at $\beta$-bits per frame. Therefore, the $(\alpha+\beta)$ bits for each frame are transmitted to the receiving station. In this case, the transmission rate is, for example, 8 kbps.

FIG. 2 is a block diagram showing a second prior art structure of the speech encoding apparatus. This prior art structure is a Code Excited Linear Prediction (CELP) encoder which is known as a low bit rate speech encoder.

Principally, a CELP encoder, like the first prior art structure shown in FIG. 1, is an apparatus for encoding and transmitting linear prediction code parameters (LPC or prediction parameters) obtained from an LPC analysis and a residual signal. However, this CELP encoder represents a residual signal by using one of the residual patterns within a code book, thereby obtaining high efficiency encoding.

Details of CELP are disclosed in Atal, B. S., and Schroeder, M. R. "Stochastic Coding of Speech at Very Low bit Rate" Proc.ICASSP 84-1610 to 1613, 1984, and a summary of the CELP encoder will be explained as follows by referring to FIG. 2.

LPC analysis unit 201 performs a LPC analysis of an input signal, and quantizer 202 quantizes the analyzed LPC parameters to be supplied to predictor 203. Pitch period m, pitch coefficient Cp and gain G, which are not shown, are extracted from the input signal.

A residual waveform pattern (code vector) is sequentially read out from the code book 204 and its respective pattern is, at first, input to multiplier 205 and multiplied by gain G. Then, the output is input to a feed-back loop, namely, a long-term predictor comprising delay circuit 206, multiplier 207 and adder 208, to synthesize a residual signal. The delay value of delay circuit 206 is set at the same value as the pitch period. Multiplier 207 multiplies the output from delay circuit 206 by pitch coefficient Cp.

A synthesized residual signal output from adder 208 is input to a feed-back loop, namely, a short term prediction unit comprising predictor 203 and adder 209, and the predicted input signal is synthesized. The prediction parameters are LPC parameters from quantizer unit 202. The predicted input signal is subtracted from an input signal at subtracter 210 to provide an error signal. Weight function unit 211 applies weight to the error signal, taking into consideration the acoustic characteristics of humans. This is a correcting process to make the error to a human ear uniform as the influence of the error on the human ear is different depending on the frequency band.

The output of weight function unit 211 is input to error power evaluation unit 212 and an error power is evaluated in respective frames.

A white noise code book 204 has a plurality of samples of residual waveform patterns (code vectors), and the above series of processes is repeated with regard to all the samples. A residual waveform pattern whose error power within a frame is minimum is selected as a residual waveform pattern of the frame.

As described above, the index of the residual waveform pattern obtained for every frame as well as LPC parameters from quantizer 202, pitch period m, pitch coefficient Cp and gain G are transmitted to a receiving station (not shown). The receiving station forms a long-term predictor with transmitted pitch period m and pitch coefficient Cp as is similar to the above case, and the residual waveform pattern corresponding to a transmitted index is input to the long-term predictor, thereby reproducing a residual signal. Further, the transmitted LPC parameters form a short-term predictor as is similar to the above case, and the reproduced residual signal is input to the short-term predictor, thereby reproducing an input signal.

Respective dynamic characteristics of an excitation unit and a vocal tract unit in a sound producing structure of a human are different, and the respective data quantity to be transmitted at arbitrary points by the excitation unit and vocal tract unit are different.

However, with a conventional speech encoding apparatus as shown in FIGS. 1 or 2, excitation information and vocal tract information are transmitted at a fixed ratio of data quantity. The above speech characteristics are not utilized. Therefore, when the transmission rate is low, quantization becomes coarse, thereby increasing noise and making it difficult to maintain satisfactory speech quality.

The above problem is explained as follows with regard to the conventional examples shown in FIGS. 1 or 2.

In a speech signal there exists a period in which characteristics change abruptly and a period in which the state is constant, and the latter value of the prediction parameters do not change too much. Namely, there are cases where co-relationship between the prediction parameters (LPC parameters) in continuous frames is strong, and cases where they are not strong. Conventionally, prediction parameters (LPC parameters) are transmitted at a constant rate with regard to each frame. Consequently, the characteristics of the speech signals are not fully utilized. Therefore, the transmission data causes redundancies and the quality of the reproduced speech in the receiving station is not sufficient for the amount of transmission data.

SUMMARY OF THE INVENTION

An object of the present invention is to provide a mode-switching-type speech encoding/decoding apparatus for providing a plurality of modes which depend on the transmission ratio between excitation information and vocal tract information, and, upon encoding, switching to the mode in which the best reproduction of speech quality can be obtained.

Another object of the present invention is to suppress redundancy of transmission information, which prevents relatively stable vocal tract information from being transmitted, and instead assigning a lot of bits to excitation information, which is useful for an improvement of quality, thereby increasing the quality of the reproduced speech. In order to achieve the above object, the present invention has adopted the following structure.

The present invention relates to a speech encoding apparatus for encoding a speech signal by separating the characteristics of said speech signal into articulation information (generally called vocal tract information) representing articulation characteristics of said speech signal, and excitation information representing excitation characteristics of said speech signal. Articulation characteristics are frequency characteristics of a voice formed by the human vocal tract and nasal cavity, and sometimes refer to only vocal tract characteristics. Vocal tract information representing vocal tract characteristics comprise LPC parameters obtained by forming a linear prediction analysis of a speech signal. Excitation information comprises, for example, a residual signal. The present invention is also based on a speech decoding apparatus. The present invention based on above speech encoding/decoding apparatus has the structure shown in FIG. 3.

A plurality of encoding units (or "ENCODERS #1 to #m")301-1 to 301-m locally decode speech signal (or "INPUT") 303 by extracting vocal tract information (or "VOCAL TRACT PARAMETERS") 304 and excitation information (or "EXCITATION PARAMETERS") 305 from the speech signal 303, by performing a local decoding on it. The vocal tract information and excitation information are generally in the form of parameters. The transmission ratios of respective encoded information are different, as shown by the reference numbers 306-1 to 306-m in FIG. 3. The above encoding units comprise a first encoding unit for encoding a speech signal by locally decoding it, and extracting LPC parameters and a residual signal from it at every frame, and a second encoding unit for encoding a speech signal by performing a local decoding on it and extracting a residual signal from it using the LPC parameters from the frame several frames before the current one, the LPC parameters being obtained by the first encoding units.

Next, evaluation/selection units (or "EVALUATION AND DECISION OF OPTIMUM ENCODER") 302-1/302-2 evaluate the quality of respective decoded signals 07-1 to 307-m subjected to local decoding by respective encoding units 301-1 to 301-m, thereby providing the evaluation result. Then they decide and select the most appropriate encoding units from among the encoding units 301-1 to 301-m, based on the evaluation result, and output a result of the selection (or "SELECT") as selection information 310. The evaluation/selection units each comprise evaluation decision unit 302-1 and selection unit 302-2, respectively as shown in FIG. 3.

The speech encoding apparatus of the above structure outputs vocal tract information 304 and excitation information 305 encoded by the encoding units selected by evaluation/selection units 302-302-2, and outputs selection information 310 from evaluation/selection unit 302-1/302-2, to, for example, line 308.

Decoding unit (or "DECODER #") 309 decodes speech signal 311 from selection information 310, vocal tract information 304 and excitation information 305, which are transmitted from the speech encoding apparatus.

With such a structure, evaluation/selection unit 302-1/302-2 selects encoding output 304 and 305 of the encoding unit, which is evaluated to be of good quality by decoding signals 307-1 to 307-m subjected to local decoding.

In the portions of the speech signal in which vocal tract information does not change, the LPC parameter is not output, thereby causing a surplus of information. As much of the surplus as possible is assigned to a residual signal, thereby improving the quality of decoded signal (or "OUTPUT") 311 obtained in a speech decoding apparatus.

In the block diagram shown in FIG. 3, the speech encoding apparatus is combined with the speech decoding apparatus through a line 308, but it is clear that only the speech encoding apparatus or only the speech decoding apparatus may be used at one time. Thus, the output from the speech encoding apparatus is stored in a memory, and the input to the speech decoding apparatus is obtained from the memory.

Vocal tract information is not limited to LPC parameters based on linear prediction analysis, but may be cepstrum parameters based, for example, on cepstrum analysis. A method of encoding the residual signal by dividing it into pitch information and noise information by a CELP encoding method or a RELP (Residual Excited Linear Prediction) method, for example, may be employed.

BRIEF DESCRIPTION OF THE DRAWINGS

FIG. 7A shows a table of an assignment of bits to be transmitted in the second prior art, and FIG. 7B is a table of an assignment of bits to be transmitted in the second embodiment of the present invention.

DESCRIPTION OF THE PREFERRED EMBODIMENTS

Figure 1:
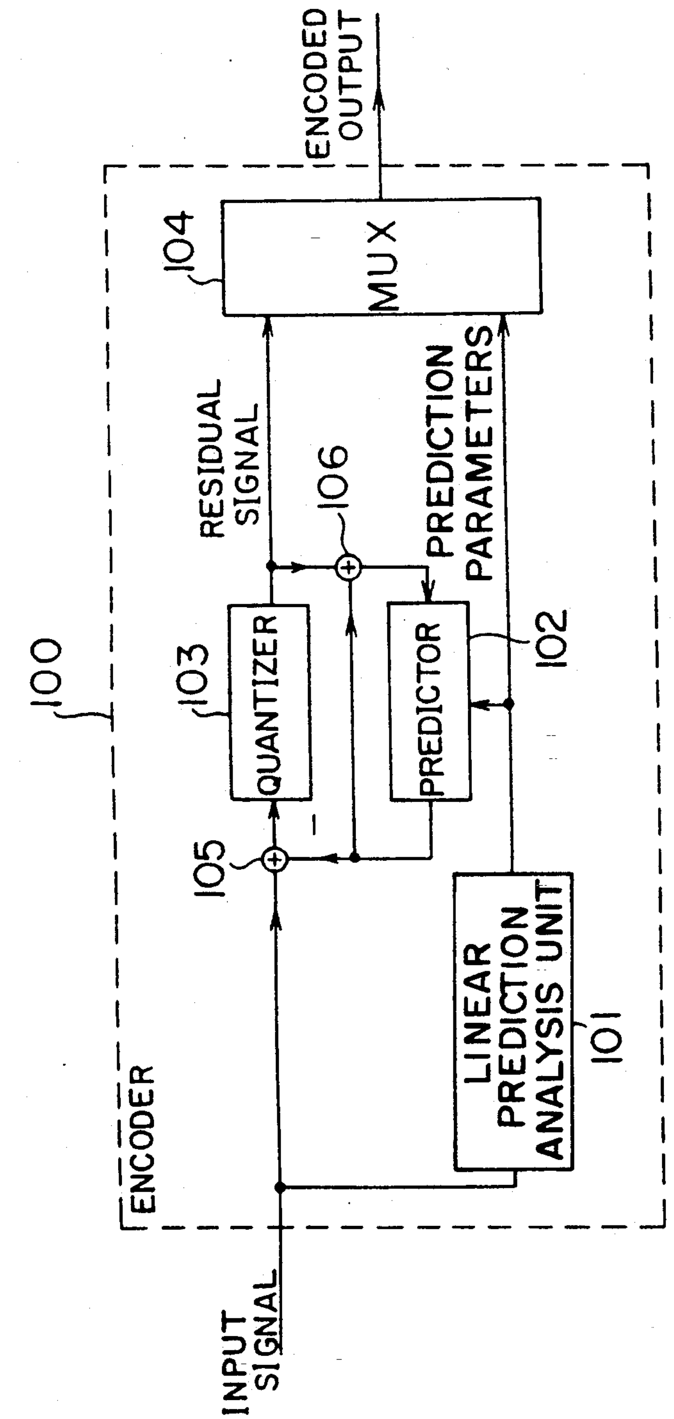
FIG. 1 PRIOR ART
FIG. 1 shows a block diagram of a first prior art structure.

The embodiment of the present invention will be explained by referring to the drawings.

Figure 4:
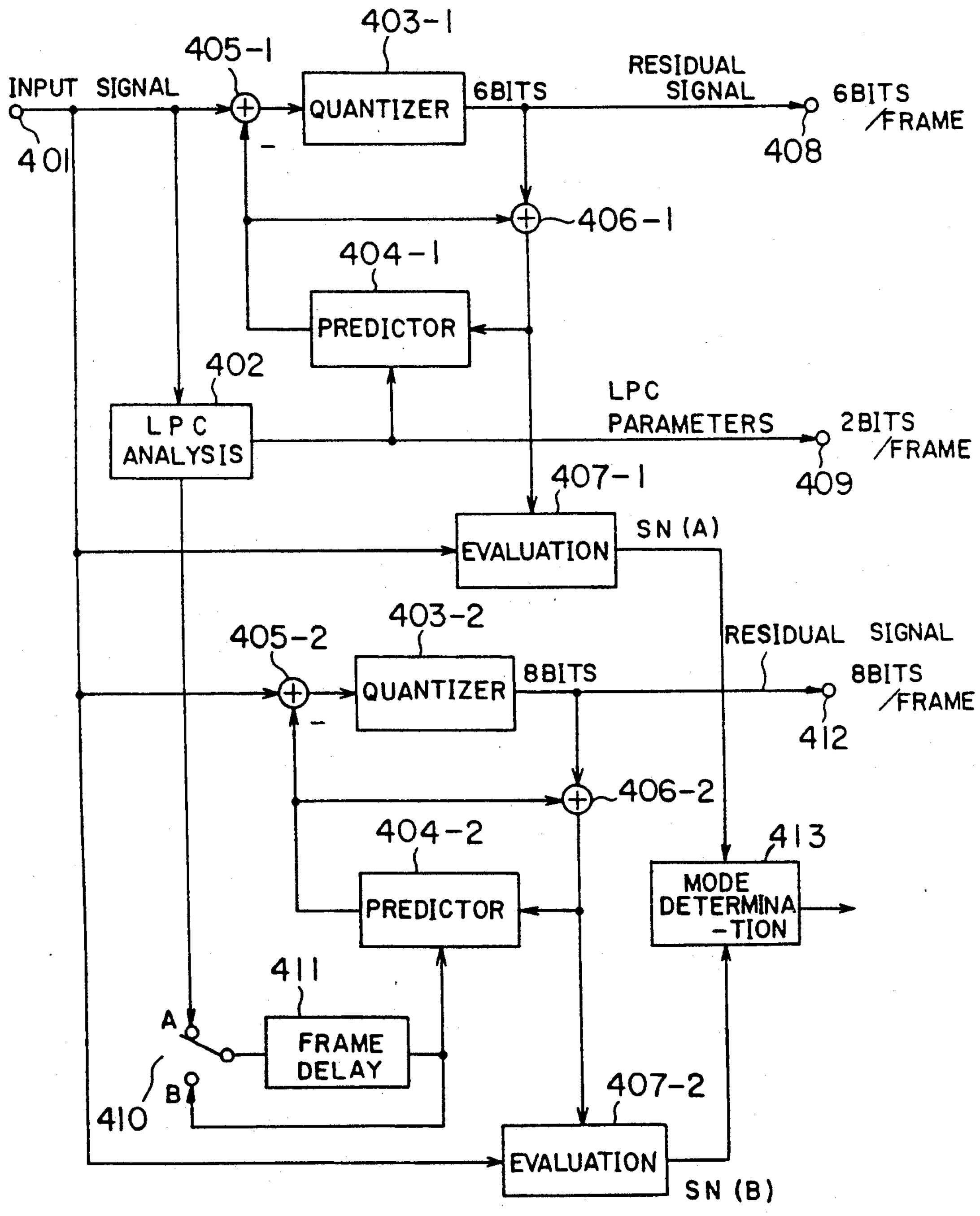
FIG. 4 shows a block diagram of the first embodiment of the present invention.

FIG. 4 shows a structural view of the first embodiment of the present invention, and this embodiment corresponds to the first prior art structure shown in FIG. 1.

The first quantizer 403-1, predictor 404-1, adders 405-1 and 406-1, and LPC analysis unit 402 correspond to the portions designated by 103, 102, 105, 106, and 101, respectively, in FIG. 1, thereby providing an adaptive prediction speech encoder. In this embodiment, a second quantizer 403-2, a second predictor 404-2, and additional adders 405-2 and 406-2 are further provided. The LPC parameters applied to predictor 404-2 are provided by delaying the output from LPC analysis unit 402 in frame delay circuit 411 through terminal A of switch 410. The portions in the upper stage of FIG. 4, which correspond to those in FIG. 1, cause output terminals 408 and 409 to transmit LPC parameters and a residual signal, respectively. This is defined as A-mode. The signal transmitted from output terminal 412 in the lower stage of FIG. 4 is only the residual signal, which is defined as B-mode. Evaluation units 407-1 and 407-2 evaluate the S/N of the encoder of the A- or B-mode. Mode determining (or "MODE DETERMINATION") portion 413 produces a signal A/B for determining which mode should be used (A-mode or B-mode) to transmit the output to an opposite station (i.e. receiving station) (not shown), based on the evaluation. Switch (SW) unit 410 selects the A side when the A-mode is selected in the previous frame. Then, as LPC parameters of the B-mode for the current frame, the values of the A-mode of the previous frame are used. When the B-mode is selected in the previous frame, the B side is selected and the values of the B-mode in the previous frame, namely, the values of the A-mode in the frame which is several frames before the current frame, are used.

In this circuit structure, the encoders of the A-and B modes operate in parallel with regard to every frame. The A-mode encoder produces current frame prediction parameters (LPC parameters) as vocal tract information from output terminal 409, and a residual signal as excitation information through output terminal 408. In this case, the transmission rate of the LPC parameters is $\beta$ bits/frame and that of a residual signal is $\alpha$ bits/frame. The B-mode encoder outputs a residual signal from output terminal 412 by using LPC parameters of the previous frame or a frame which is several frames before the current frame. In this case, the transmission rate of the residual signal is $(\alpha+\beta)$bits/frame, so the number of bits for the residual signal can be increased by the number of bits that are not being used for the LPC parameters, as the LPC parameters vary little. Input signals to predictors 404-1 and 404-2 are locally decoded outputs from adders 406-1 and 406-2. They are equal to signals that are decoded in the receiving station. Evaluation units 407-1 and 407-2 compare these locally decoded signals with their input signals from input terminal 401 to evaluate the quality of the decoded speech. Signal to quantization noise ratio SNR within a frame, for example, is used for this evaluation, enabling evaluation units 407-1 and 407-2 to output SN(A) and SN(B). The mode determination unit 413 compares these signals, and if SN(A)>SN(B), a signal designating A-mode is output, and if SN(A)<SN(B), a signal designating B-mode is output.

A signal designating A-mode or B-mode is transmitted from mode determination unit 413 to a selector (not shown). Signals from output terminals 408, 409, and 412 are input to the selector. When the selector designates A-mode, the encoded residual signal and LPC parameters from output terminals 408 and 409 are selected and output to the opposite station. When the selector designates B-mode, the encoded residual signal from output terminal 412 is selected and output to the opposite station.

Selection of A- or B-modes is conducted in every frame. The transmission rate is $(\alpha+\beta)$ bits per frame as described above and is not changed in any mode. The data of $(\alpha+\beta)$ bits per frame is transmitted to a receiving station after a bit per frame representing an A/B signal designating whether the data is in A-mode or B-mode is added to the data of $(\alpha+\beta)$ bits per frame.

The data obtained in B-mode is transmitted if B-mode provides better quality. Therefore, the quality of reproduced speech in the present invention is better than in the prior art shown in FIG. 1, and the quality of the reproduced speech in the present invention can never be worse than in the prior art.

Figure 2:
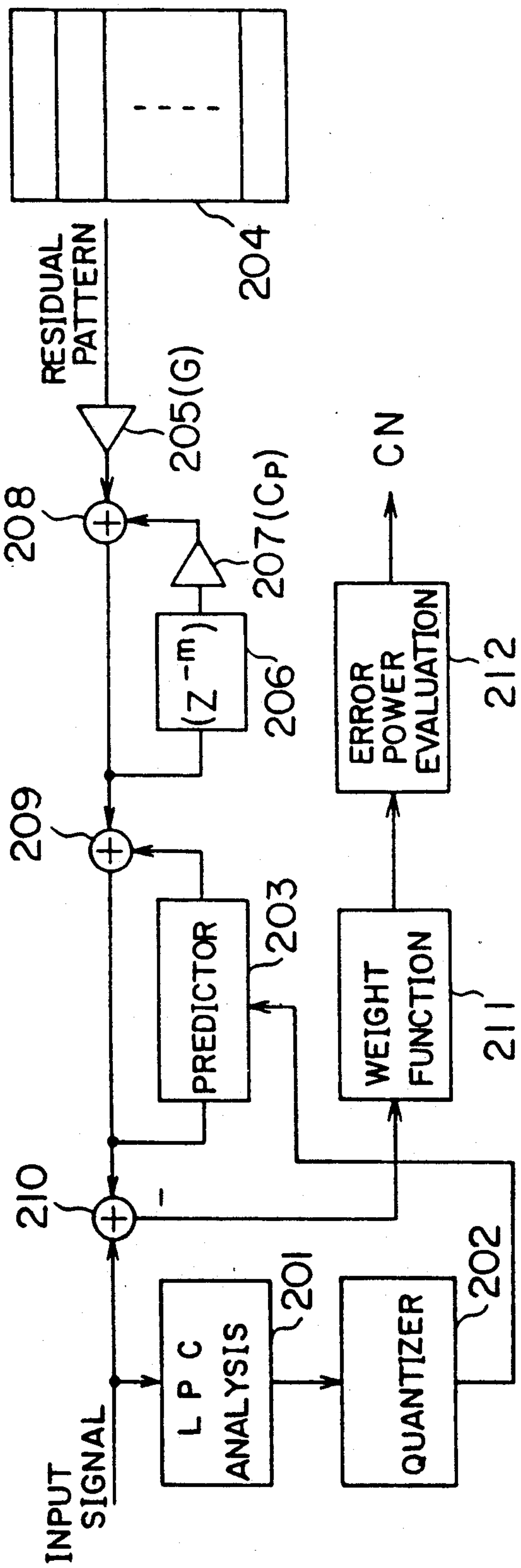
FIG. 2 PRIOR ART
FIG. 2 shows a block diagram of a second prior art structure.
Figure 3:
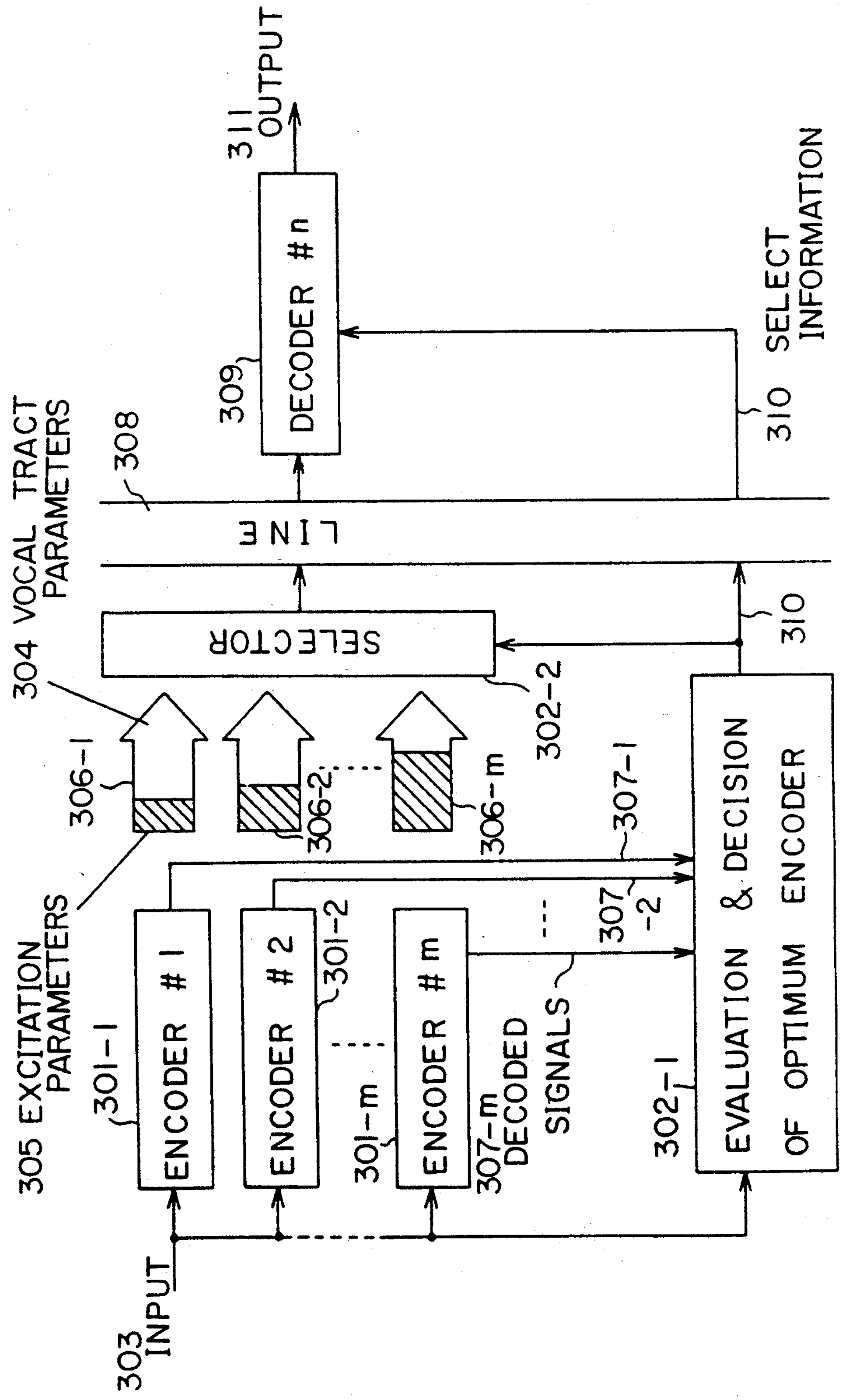
FIG. 3 depicts a block diagram for explaining the principle of the present invention.
Figure 5:
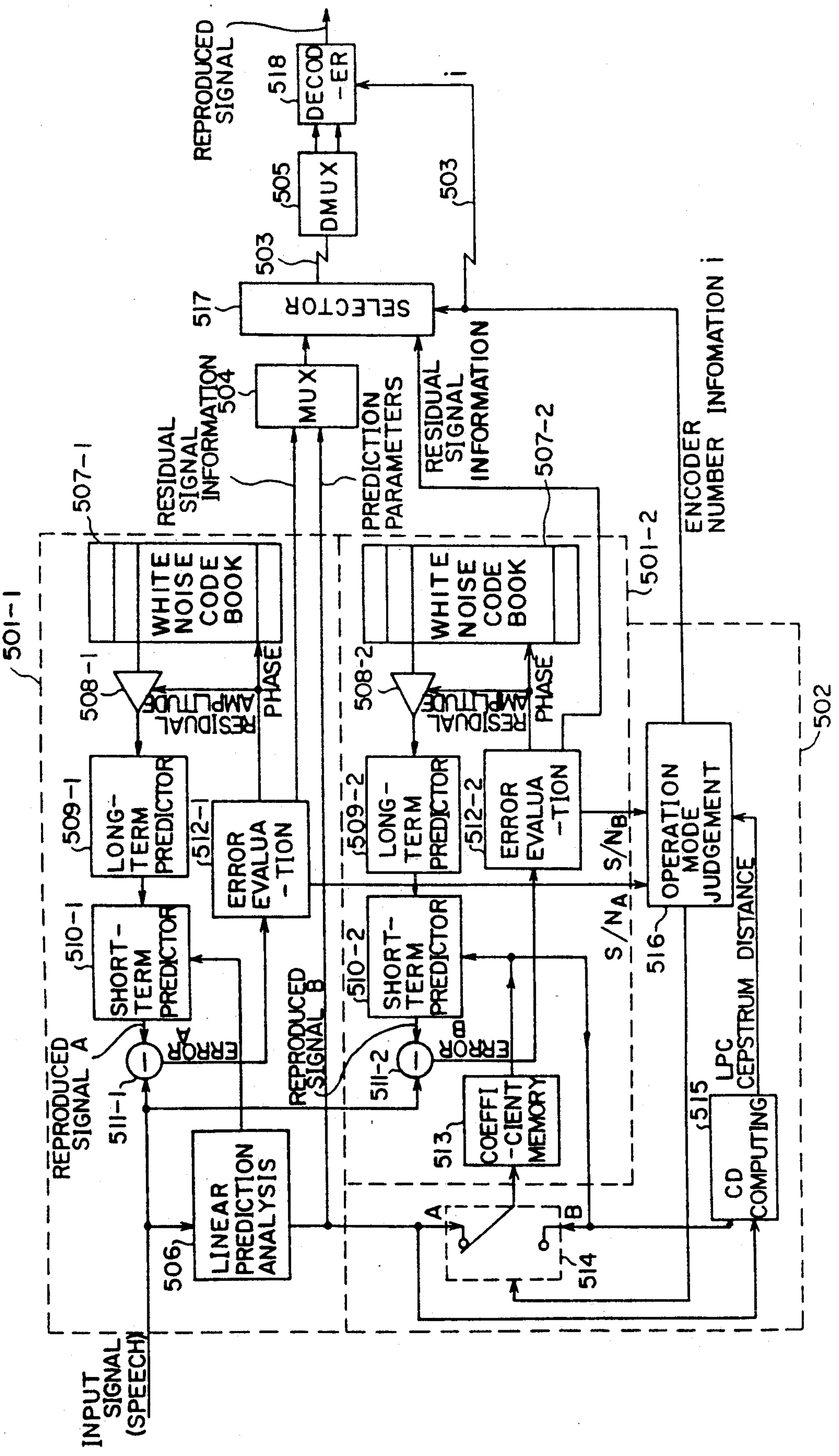
FIG. 5 represents a block diagram of the second embodiment of the present invention.

FIG. 5 is a structural view of the second embodiment of this invention. This embodiment corresponds to the second prior art structure shown in FIG. 2. In FIG. 5, 501-1 and 501-2 depict encoders. These encoders are both CELP encoders, as shown in FIG. 2. One of them, 501-1, performs linear prediction analysis on every frame by slicing speech into 10 to 30 ms portions, and outputs prediction parameters, residual waveform pattern, pitch frequency, pitch coefficient, and gain. The other encoder, 501-2, does not perform linear prediction analysis, but outputs only a residual waveform pattern. Therefore, as described later, encoder 501-2 can assign more quantization bits to a residual waveform pattern than encoder 501-1 can.

The operation mode using encoder 501-1 is called A-mode and the operation mode using encoder 501-2 is called B-mode.

In encoder 501-1, linear prediction analysis unit 506 performs the same function as both LPC analysis unit 201 and quantizing unit 202. White noise code book 507-1, gain controller 508-1, and error computing unit 511-1, respectively, correspond to those features designated by the reference numbers 204, 205, and 210 in FIG. 2. Long-term prediction (or "LONG-TERM PREDICTOR") unit 509-1 corresponds to those features designated by the reference numbers 206 to 208 in FIG. 2. It performs an excitation operation by receiving pitch data as described in conjunction with the second, prior art structure. Short-term prediction (or "SHORT-TERM PREDICTOR"), unit 510-1 corresponds to those features represented by the reference numbers 203 and 209 in FIG. 2, and functions as a vocal tract by receiving prediction parameters as described in the second prior art. In addition, error evaluation unit 512-1 corresponds to those features designated by the reference numbers 211 and 212 in FIG. 2, and performs an evaluation of error power as described in conjunction with the second prior art structure. In this case, error evaluation unit 512-1 sequentially designates addresses (phases) in white noise code book 507-1, and performs evaluations of error power of all the code vectors (residual patterns) as described in the second prior art structure. Then it selects the code vector that has the lowest error power, thereby producing, as the residual signal information, the number of the selected code vector in white noise code book 507-1.

Error evaluation unit 512-1 also outputs a segmental S/N ($S/N_A$) that has waveform distortion data within a frame.

Encoder 501-1, described in reference to FIG. 2, produces encoded prediction (or "PREDICTION") parameters (LPC parameters) from linear prediction analysis unit 506. It also produces encoded pitch period, pitch coefficient and gain (not shown).

In encoder 501-2, the portions designated by the reference numbers 507-2 to 512-2 are the same as respective portions designated by reference numbers 507-1 to 512-1 in encoder 501-1. Encoder 501-2 does not have linear prediction analysis unit 506; instead, it has coefficient memory 513. Coefficient memory 513 holds prediction coefficients (prediction parameters) obtained from linear prediction analysis unit 506. Information from coefficient memory 513 is applied to short term prediction (or "SHORT-TERM PREDICTOR") unit 510-2 as linear prediction parameters.

Coefficient memory 513 is renewed every time the A-mode is produced (every time output from encoder 501-1 is selected). It is not renewed and maintains the values when a B-mode is produced (when the output from encoder 501-2 is selected). Therefore, the most recent prediction coefficients transmitted to a decoder station (receiving station) are always kept in coefficient memory 513.

Encoder 501-2 does not produce prediction parameters but produces residual signal information, pitch period, pitch coefficients and gain. Therefore, as is described later, more bits can be assigned to the residual signal information by the number of bits corresponding to the quantity of prediction parameters that are not output.

Quality evaluation/encoder selection unit 502 selects encoder 501-1 or 501-2, whichever has the better speech reproduction quality, based on the result obtained by a local decoding in respective encoders 501-1 and 501-2. Quality evaluation/encoder selection unit 502 also uses waveform distortion and spectral distortion of reproduced speech signals A and B to evaluate the quality of speech reproduced by encoders 501-1 or 501-2. In other words, unit 502 uses segmental S/N and LPC cepstrum distance (CD) of respective frames in parallel to evaluate the quality of reproduced speech.

Therefore, quality evaluation/encoder selection unit 502 is provided with cepstrum distance (or "CD") computing unit 515, operation mode judgement unit 516, and switch 514.

Cepstrum distance computing unit 515 obtains the first LPC cepstrum coefficients from the LPC parameters that correspond to the present frame, and that have been obtained from linear prediction analysis unit 516. Cepstrum distance computing unit 515 also obtains the second LPC cepstrum coefficients from the LPC parameters that are obtained from coefficient memory 513 and are currently used in the B-mode. Then it computes LPC cepstrum distance CD in the current frame from the first and second LPC cepstrum coefficients. It is generally accepted that the LPC cepstrum distance thus obtained clearly expresses the difference between the above two sets of vocal tract spectral characteristics determined by preparing LPC parameters (spectral distortion).

Figure 6:
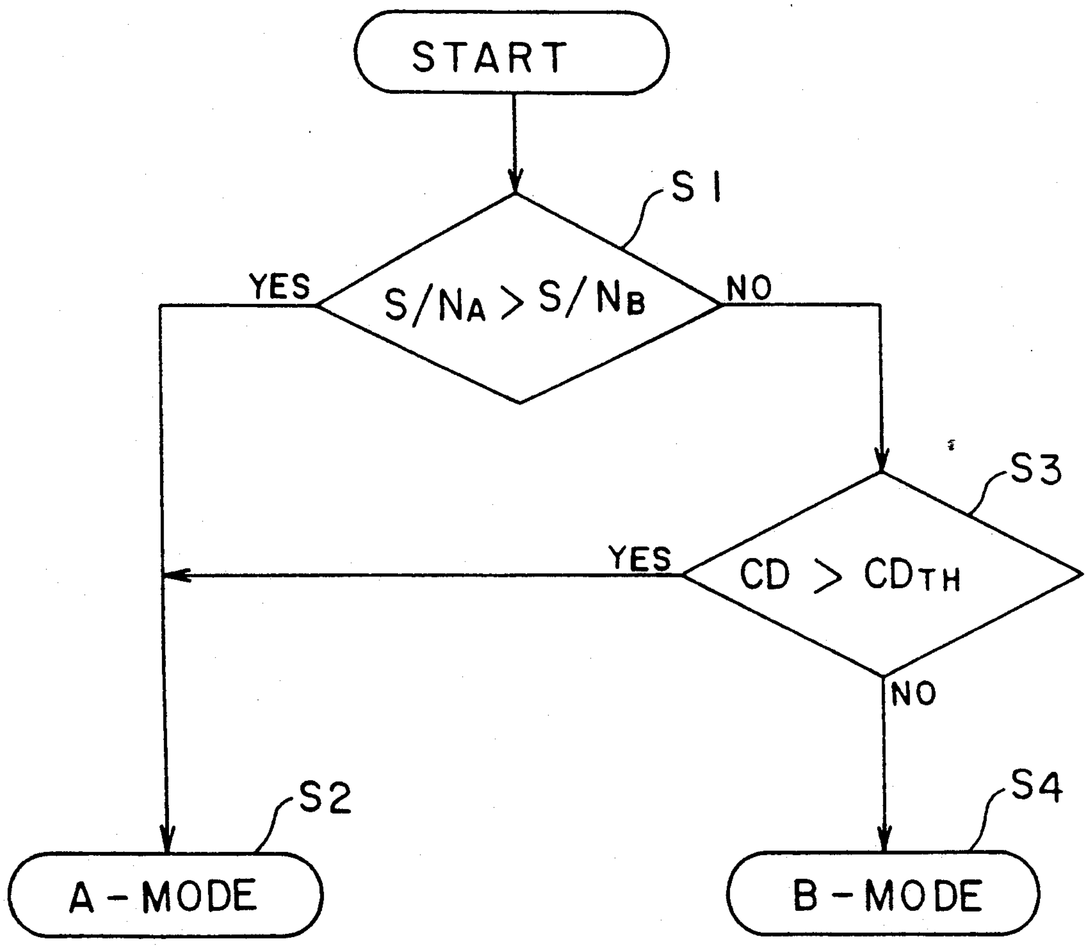
FIG. 6 depicts an operation flow chart of the second embodiment.

Operation mode judgement unit 516 receives segmental $S/N_A$ and $S/N_B$ from encoders 501-1 and 501-2, and receives the LPC cepstrum distance (CD) from cepstrum distance computing unit 515 to perform the process shown in the operation flow chart of FIG. 6.

This process will be described later.

Where operation mode judgement unit 516 selects the A-mode (encoder 501-1), switch 514 is switched to the A-mode terminal side. Where operation mode judgement unit 516 selects B-mode (encoder 501-2), switch 514 is switched to the B-mode terminal side. Every time A-mode is produced (output from encoder 501-1 is selected) by a switching operation of switch 514, coefficient memory 513 is renewed. When the B-mode is produced (so that the output from encoder 501-2 is selected) coefficient memory 513 is not renewed and maintains the current values. Multiplexing (or "MUX") unit 504 multiplexes residual signal information and prediction parameters from encoder 501-1. Selector 517 selects one of the outputs obtained from multiplexing unit 504, i.e. either the multiplexed output (comprising residual signal information and prediction parameters) obtained from encoder 501-1 or the residual signal information output from encoder 501-2, based on encoder number information i obtained from operation mode judgement unit 516.

Decoder 518 outputs a reproduced speech signal based on residual signal information and prediction parameters from encoder 501-1, or residual signal information from encoder 501-2. Thus decoder 518 has a structure similar to those of white noise code books 507-1 and 507-2, long-term prediction units 509-1 and 509-2, and short-term prediction units 510-1 and 510-2 in encoders 501-1 and 501-2.

Separation unit (DMUX) 505 separates multiplexed signals transmitted from encoder 501-1 into residual signal information and prediction parameters.

In FIG. 5, units to the left of transmission path 503 are on the transmitting side and units to the right are on the receiving side.

With the above structure, a speech signal is encoded with regard to prediction parameters and residual signals in encoder 501-1, or with regard to only the residual signals in encoder 501-2. Quality evaluation/encoder selection unit 502 selects the number i of encoder 501-1 or 501-2 that has the best speech reproduction quality, based on segmental S/N information and LPC cepstrum distance information of every frame. In other words, operation mode judgement unit 516 in quality evaluation/encoder selection unit 502 carries out the following process in accordance with the operation flow chart shown in FIG. 6.

Encoder 501-1 or 501-2 is selected by inputting encoder number i. In A-mode, $i=1$; in B-mode $i=2$. If segmental S/N in encoder 501-1 is better than that of encoder 501-2 ($S/N_A > S/N_B$), the A-mode is selected by inputting encoder, number 1 (encoder 501-1) to selector 517 (in FIG. 6, S1→S2).

On the other hand, if segmental S/N in encoder 501-2 is better than that of encoder 501-1 ($S/N_A < S/N_B$), the following judgement is further executed. LPC cepstrum distance CD from cepstrum computing unit 515 is compared with a predetermined threshold value $CD_{TH}$ (S3). When CD is smaller than the threshold value $CD_{TH}$ (the spectral distortion is small), B-mode is selected so that encoder number 2 is input (encoder 501-2) to selector 517 (S4). When CD is larger than the above threshold value $CD_{TH}$ (the spectral distortion is large), A-mode is selected by inputting encoder number 1 (encoder 501-1) to selector 516 (S3→S2).

The above operation enables the most appropriate encoder to be selected.

The reason why two evaluation functions are used as described above is that where A-mode is selected, linear prediction analysis unit 506 always computes prediction parameters according to the current frame. This ensures that the best spectral characteristics are obtained, so the A-mode can be selected merely on the condition that the segmental $S/N_A$ that represents a distortion in the time domain is good. In contrast, where B-mode is selected, although the segmental $S/N_B$ that represents a distortion in time domain may be good, this is sometimes merely because the quantization gain of the reproduced signal in the B-mode is better. In this case, there is the possibility that spectral characteristics of the current frame (determined by the prediction parameters obtained from coefficient memory 513) may be greatly shifted from the real spectral characteristics of the current frame (determined by the prediction parameters obtained from linear prediction analysis unit 506). Namely, the prediction parameters obtained from coefficient memory 513 are those corresponding to the previous frames, and the prediction parameters of the present frame may be very different from those of the previous frame, even though the distortion in time domain of B-mode is less than that of A-mode. In the above case, the reproduced signal on the decoding side includes a large spectral distortion to accomodate the human ear. Therefore, when B-mode is selected, it is necessary to evaluate the distortion in frequency domain (spectral distortion based on LPC cepstrum distance CD) in addition to the distortion in time domain.

When the segmental S/N of encoder 501-2 is better than that of encoder 501-1, and the spectral characteristics of the current frame are not very different from those of the previous frame, the prediction spectrum of the current frame is not very different from that of the previous frame, so only the residual signal information is transmitted from the encoder 501-2. In this case, more quantizing bits are assigned to the residual signal, and the quantization quality of the residual signal is increased. A greater number of bits is transmitted than in the case where both prediction parameters and residual signals are transmitted to the opposite station. The B-mode (encoder 501-2) can be effectively used, for example, when the same sound "aaah" continues to be enunciated over a series of frames.

Coefficient memory 513 of encoder 501-2 is renewed every time the A-mode is selected (every time output from encoder 501-1 is selected). Coefficient memory 513 is not renewed, but maintains the values stored when the B-mode is selected (output from encoder 501-2 is selected).

After this, based on the selection result by quality evaluation/encoder selection unit 502, selector 517 selects encoder 501-1 or 501-2 (whichever has the best quality of speech reproduction). The output of the quality evaluation/encoder selection unit 502 is transmitted to transmission path 503.

Decoder 518 produces the reproduced signal based on encoded output (residual signal information and prediction parameters from encoder 501-1 or residual signal information alone from encoder 501-2) and encoder number data i, which are sent through transmission path 503.

The information to be transmitted to the receiving side comprises the code numbers of residual signal information and quantized prediction parameters (LPC parameters), and so on, in the A-mode, and comprises the code numbers of the residual signal information, and so on, in the B-mode. In the B-mode, the LPC parameter is not transmitted, but the total number of bits is the same in both the A-mode and B-mode. The code number shows which residual waveform pattern (code vector) is selected in white noise code book 07-1 or 507-2. White noise code book 507-1 in encoder 501-1 contains a small number of residual waveform patterns (code vectors) and a small number of bits that represent the code number. In contrast, white noise code book 507-2 in encoder 501-2 contains a large number of codes and a large number of bits that correspond to the code number. Therefore, in B-mode, the reproduced signal is likely to be more similar to the input signal.

Where the total transmission bit rate is 4.8 kbps, an example of the assignment of the transmission bit for one frame is shown in FIGS. 7A and 7B in the second prior art structure shown in FIG. 2 and in the second embodiment shown in FIG. 5. FIGS. 7A and 7B clearly show that in A-mode, the bit assigned to each item of information in the embodiment of FIG. 7B is almost the same as that of the second prior art structure shown in FIG. 7A. However, in B-mode of the present embodiment shown in FIG. 7B, LPC parameters are not transmitted, so the bits not needed for the LPC parameters can be assigned to the code number and gain information, thereby improving the quality of the reproduced speech.

As explained above, the present embodiment does not transmit prediction parameters for frames in which the prediction parameters of speech do not change much. The bits that are not needed for the prediction parameters are used to improve the sound quality of the data to be transmitted by increasing the number of bits assigned to the residual signal, or that of bits assigned to the code number necessary for increasing the capacity of the driving code table, thereby improving the quality of the reproduced speech signal on the receiving side.

In the present embodiment, in response to the dynamic characteristics of the excitation portion and vocal tract portion in a sound production mechanism of natural human speech, the transmission ratio of the excitation information to the vocal tract information can be controlled in the encoder. This prevents the S/N ratio from deteriorating even at low transmission rates, and good speech quality is maintained.

It should be noted that both encoder 501-1 and 501-2 may produce residual signal information and prediction parameter information. In this case, the ratios of bits assigned to the residual signal information and prediction parameters are different in the two encoders.

As is clear from the above, more than two encoders may be provided. An encoder that produces residual signal information and prediction parameter information may work alongside some encoders that produce only residual signal information. Note however, that the râtio bits assigned to residual signal information and prediction parameter information differs depending on the encoders. In order to perform quality evaluation of the reproduced speech in an encoder, in addition to the case in which both waveform distortion and spectral distortion of the reproduced speech signal are used, either of these two distortions may be used.

As described above in detail, the mode switching type speech encoding apparatus of the present invention provides a plurality of modes in regard to a transmission ratio of excitation information vocal tract information, and performs a switching operation between the modes to obtain the best reproduced speech quality. Thus, the present invention can control the transmission ratio of excitation information to vocal tract information in encoders, and satisfactory quality of sound can be maintained even at a lower transmission rate.

What is claimed is:

1. A speech encoding apparatus for encoding a speech signal by separating a plurality of characteristics of said speech signal into articulation information representing at least one of a plurality of articulation characteristics of said speech signal, and excitation information representing at least one of a plurality of excitation characteristics of said speech signal, comprising:

a plurality of encoding means for encoding the articulation information and the excitation information extracted from said speech signal by performing a local decoding of said speech signal, each of said plurality of encoding means having a different ratio of a transmission rate between the encoded articulation information and the encoded excitation information as compared to a similar ratio of other ones of said plurality of encoding means; and evaluation/selection means for evaluating a quality of each of a plurality of decoded signals based on the encoded articulation information and the encoded excitation information, from respective ones of said plurality of encoding means to provide an evaluation result, and for determining and selecting a most appropriate one of the plurality of encoding means from among said plurality of encoding means, based on the evaluation result, to output a result indicative of the most appropriate one of the plurality of encoding means, as selection information, the encoding means selected by said evaluation/selection means outputting said encoded articulation information and said encoded excitation information, and said evaluation/selection means outputting said selection information.

2. The speech encoding apparatus according to claim 1, wherein:

said articulation information comprises at least one of a plurality of linear prediction coding parameters representing at least one of a plurality of vocal tract characteristics, and said excitation information comprises a residual signal representing at least one of a plurality of excitation characteristics.

3. A speech encoding apparatus according to claim 1, wherein said evaluation/selection means evaluates the quality of each of the plurality of decoded signals by computing a waveform distortion for each of the plurality of decoded signals, and determines and selects one of said plurality of encoding means corresponding to one of the plurality of decoded signals which has a relatively small waveform distortion compared to other ones of said plurality of decoded signals.

4. A speech encoding apparatus according to claim 1, wherein said evaluation/selection means evaluates the quality of each of the plurality of decoded signals by computing a spectral distortion for each of the plurality of decoded signals, and decides and selects one of said plurality of encoding means corresponding to one of the plurality of decoded signals which has a relatively small spectral distortion compared to other ones of the plurality of decoded signals.

5. A speech encoding apparatus according to claim 1, wherein said evaluation/selection means evaluates the quality of each of the plurality of decoded signals by computing a waveform distortion and a spectral distortion for each of the plurality of decoded signals, and determines and selects one of said plurality of encoding means based on said waveform distortion and said spectral distortion.

6. A speech encoding apparatus for encoding a speech signal by separating a plurality of characteristics of said speech signal into at least one of a plurality of linear prediction coding parameters representing at least one of a plurality of vocal tract characteristics of said speech signal and a residual signal representing at least one of a plurality of excitation characteristics of said speech signal at every predetermined frame, comprising:

first encoding means for encoding said speech signal by performing a local decoding of said speech signal to provide a first decoded signal and extracting at least one of a plurality of linear prediction coding parameters and said residual signal from said speech signal at every predetermined frame;

second encoding means for encoding said speech signal by performing a local decoding of said speech signal to provide a second decoded signal and extracting said residual signal from said speech signal by using said at least one of a plurality of linear prediction coding parameters of a past frame preceding a present frame, said at least one of a plurality of linear prediction coding parameters being obtained from said first encoding means;

evaluation/selection means for evaluation a quality of said first and second decoded signals, to determine and select an appropriate one of said first and second encoding means, wherein:

when said evaluation/selection means selects the first encoding means as the appropriate one of said first and second encoding means, said at least one of a plurality of linear prediction coding parameters and said residual signal encoded by said first encoding means, and selection information from said evaluation/selection means are output, and when said second encoding means is selected by said evaluation/selection means as the appropriate one of said first and second encoding means, said residual signal encoded by said second encoding means and selection information obtained by said evaluation/selection means are output.

7. A speech encoding apparatus according to claim 6, wherein said evaluation/selection means evaluates the quality of said first and second decoded signals by computing a waveform distortion and a spectral distortion for each of said first and second decoded signals, and said evaluation/selection means determines and selects the first encoding means where the waveform distortion of the first decoded signal is smaller than the waveform distortion of the second decoded signal, and said evaluation/selection means determines and selects said first encoding means where the waveform distortion of the second decoded signal is smaller than the waveform distortion of the first decoded signal and where the spectral distortion of the first decoded signal is smaller than the spectral distortion of the second decoded signal, and said evaluation/selection means determines and selects the second encoding means, where the waveform distortion of the second decoded signal is smaller than the waveform distortion of the first decoded signal and where the spectral distortion of the second decoded signal is smaller than the spectral distortion of the first decoded signal.

8. A speech decoding apparatus for decoding a speech signal, comprising:

first decoding means for generating and outputting a first decoded speech signal based on at least one of a first plurality of encoded linear prediction coding parameters and an encoded residual signal of a current frame, when selection information is in a first state; and second decoding means for generating and outputting a second decoded speech signal from at least one of a second plurality of encoded linear prediction coding parameters obtained before the current frame, and the encoded residual signal of the current frame, when selection information is in a second state.

9. A speech encoder/decoder apparatus for encoding a speech signal by separating a plurality of characteristics of said speech signal into articulation information representing at least one of a plurality of articulation characteristics of said speech signal, which is encoded to provide encoded articulation information, and excitation information representing at least one of a plurality of excitation characteristics of said speech signal, which is encoded to provide encoded excitation information, and for decoding said speech signal based on said encoded articulation information, and on said encoded excitation information, comprising:

a plurality of encoding means for encoding the articulation information and the excitation information extracted from said speech signal by performing a local decoding of said speech signal, a transmission ratio of said articulation information to said excitation information in one of said plurality of encoding means being different from a similar transmission ratio in another one of said plurality of encoding means;

evaluation/selection means for evaluating quality of each of a plurality of decoded speech signals based on the encoded articulation information and the encoded excitation information, from respective ones of said plurality of encoding means to provide an evaluation result, and for determining and selecting a most appropriate one of the plurality of encoding means from among said plurality of encoding means, based on said evaluation result, to output a result indicative of the most appropriate one of the plurality of encoding means as selection information; and decoding means for decoding said speech signal to generate each of the plurality of decoded speech signals using said selection information from said evaluation/selection means and said articulation information and said excitation information encoded by the most appropriate one of the plurality of encoding means selected by said evaluation/selection means.

10. A method for adjusting an amount of vocal tract information used in a communication system, comprising the steps of:

a) encoding an input signal based on at least one of a plurality of linear prediction coding parameters during a first time period to provide a first encoded signal including a first amount of vocal tract information;

b) encoding the input signal based on the at least one of the plurality of linear prediction coding parameters during a second time period to provide a second encoded signal including a second amount of vocal tract information which is different from the first amount of vocal tract information;

c) decoding the first encoded signal of said step (a) to provide a first decoded signal;

d) comparing the first decoded signal of said step (c) with the input signal to provide a first result signal;

e) decoding the second encoded signal of said step (b) to provide a second decoded signal;

f) comparing the second decoded signal of said step (e) with the input signal to provide a second result signal;

g) comparing the first and second result signals of said steps (d) and (f), respectively, to provide a third result signal; and h) reproducing the input signal for use as an output signal by sing at least one of the first and second encoded signals of said steps (a) and (b), respectively, based on the third result signal of said step (g).

11. A method for selecting between a first encoded signal and a second encoded signal for use in reproducing an input signal, comprising the steps of:

a) decoding the first encoded signal to provide a first decoded signal;

b) decoding the second encoded signal to provide a second decoded signal;

c) comparing the first decoded signal of said step (a) to the input signal to provide a first signal-to-noise ratio;

d) comparing the second decoded signal with the input signal to provide a second signal-to-noise ratio;

e) determining whether the first signal-to-noise ratio is greater than the second signal-to-noise ratio;

f) selecting the first encoded signal to reproduce the input signal if the first signal-to-noise ratio is greater than the second signal-to-noise ratio;

g) computing a cepstrum distance based on the second encoded signal;

h) comparing the cepstrum distance with a predetermined value;

i) selecting the second encoded signal to reproduce the input signal if the cepstrum distance is greater than the predetermined value; and j) selecting the first encoded signal to reproduce the input signal when the cepstrum distance is not greater than the predetermined value.

12. A method for improving quality of an encoded input signal, comprising the steps of:

a) encoding an input signal based on at least one of a plurality of modes which each have a transmission ratio between excitation information and vocal tract information which differs from any of the other ones of the plurality of modes, to provide a plurality of encoded signals;

b) reproducing the input signal using at least one of plurality of encoded signals to provide a plurality of reproduced signals;

c) comparing the plurality of reproduced signals with the input signal; and d) selecting one of the plurality of an encoded signals as the encoded input signal, based on said step (c).

* * * * *

UNITED STATES PATENT AND TRADEMARK OFFICE

CERTIFICATE OF CORRECTION

PATENT NO. : 5,115,469

DATED : May 19, 1992

INVENTOR(S) : Taniguchi et al.

It is certified that error appears in the above-identified patent and that said Letters Patent is hereby corrected as shown below:

Title Page, [56] References Cited, Col. 2, under U.S. Patent 4,303,803, change the class from "581" to --381--.

Column 2, line 16, after "Atal, B.S." delete ",";

Column 2, line 41, delete "unit".

Column 4, line 26, change "07-1" to --307-1--;

Column 4, line 42, change "#")" to -- #n")--.

Column 4, line 56, after "signal" insert --(or "OUTPUT")--;

Column 4, line 57, after "signal" delete --(or "OUTPUT")--.

Column 5, line 53, delete "the";

UNITED STATES PATENT AND TRADEMARK OFFICE

CERTIFICATE OF CORRECTION

PATENT NO. : 5,115,469

DATED : May 19, 1992

INVENTOR(S) : Taniguchi et al.

It is certified that error appears in the above-identified patent and that said Letters Patent is hereby corrected as shown below:

Column 7, line 11, after "second" delete ",";

Column 10, line 34, change "07-1" to --507-1--;

Column 10, line 47, beginning at "Figs. 7A" make this a new paragraph.

Column 12, line 65, change "evaluation" to --evaluating--. (2nd occurrence)

Column 14, line 55, change "sing" to --using--.

Column 16, line 12, after "of" insert --the--.

Signed and Sealed this

Twenty-eighth Day of September, 1993

Attest:

BRUCE LEHMAN

Attesting Officer

Commissioner of Patents and Trademarks